July 16, 1940.	E. J. TATE	2,207,954
HAND THROTTLE FOR AUTOMOBILES
Filed Jan. 8, 1940	2 Sheets-Sheet 1

Inventor
Everett Joseph Tate
By Clarence A. O'Brien
and Hyman Berman
Attorneys

July 16, 1940.  E. J. TATE  2,207,954
HAND THROTTLE FOR AUTOMOBILES
Filed Jan. 8, 1940  2 Sheets-Sheet 2

Inventor
Everett Joseph Tate

By Clarence A. O'Brien
and Hyman Berman
Attorneys

Patented July 16, 1940

2,207,954

UNITED STATES PATENT OFFICE 2,207,954

HAND THROTTLE FOR AUTOMOBILES

Everett Joseph Tate, Seattle, Wash.

Application January 8, 1940, Serial No. 312,976

7 Claims. (Cl. 74—487)

This invention relates to a hand throttle for automobiles, and the primary purpose thereof is to provide a convenient means directly on the steering wheel of the automobile and in the form of a spoke of said steering wheel to permit the driver to control the speed of the engine of the automobile by the hand, so that the foot and leg employed to operate the accelerator pedal may be rested and is especially useful when driving at substantially constant speed where stops or slowing down of the automobile are infrequent and also permits the driver to conveniently control the speed of the engine by the hand when starting the automobile on a hill or grade allowing the feet to be free for the operation of the brakes and clutch of the autobomile.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a steering wheel and steering post provided with a steering column equipped with a hand throttle constructed in accordance with my invention.

Figure 4 is a side elevation illustrating the modification of the present invention.

Figure 1:
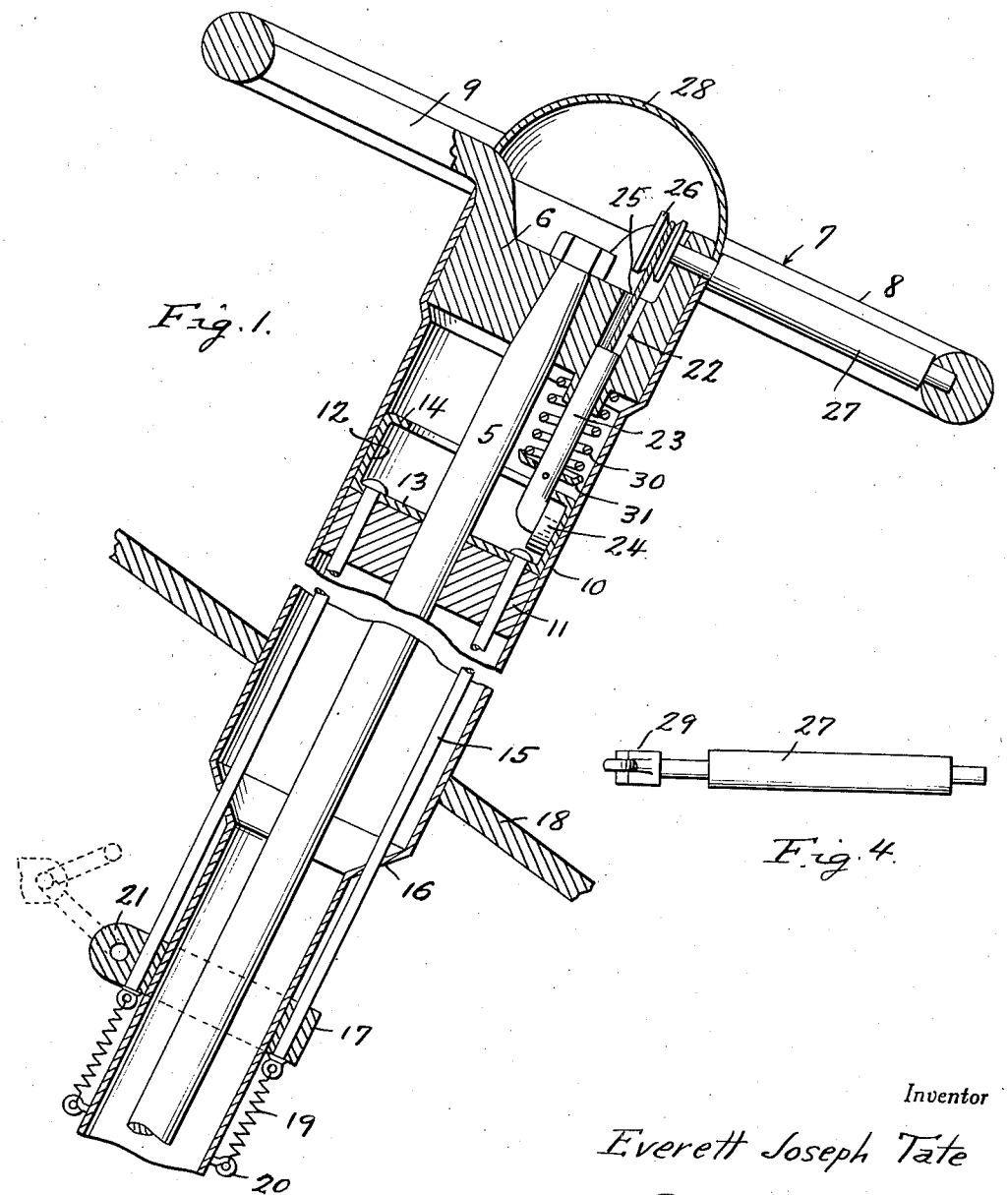
Figure 2:
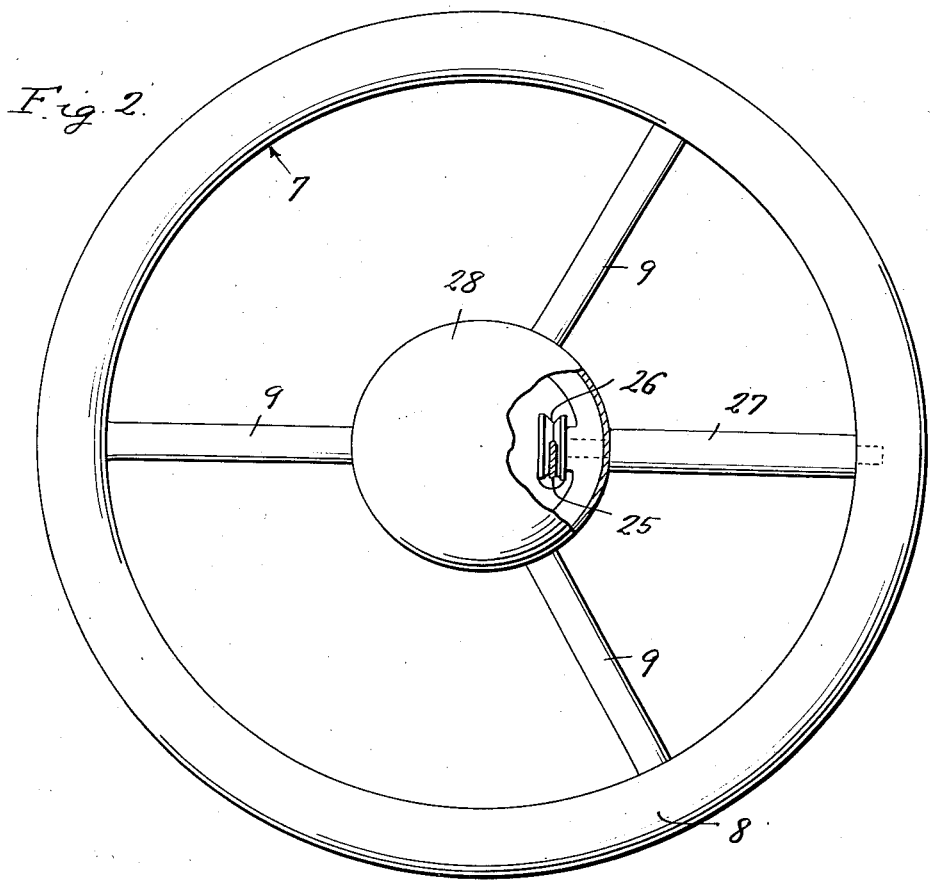
Figure 2 is a top plan view, partly in section, illustrating the steering wheel with a portion of the present invention adapted thereto.
Figure 3:
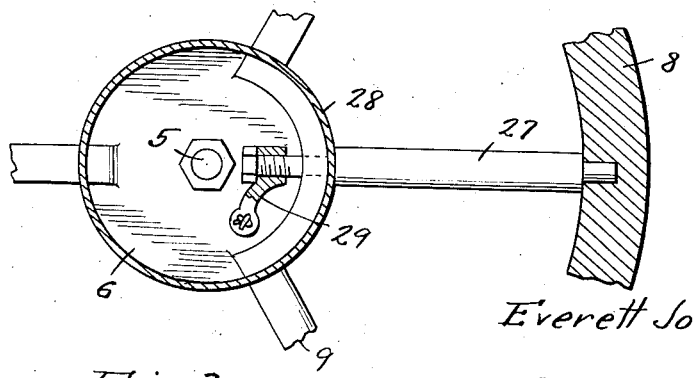
Figure 3 is a fragmentary longitudinal sectional view illustrating a modified form of the present invention.

Referring in detail to the drawings, the numeral 5 indicates a steering post of an automobile to which is secured the hub 6 of a steering wheel 7. The steering wheel includes the usual annular rim 8 connected to the hub 6 by spokes 9. Surrounding the steering post and spaced therefrom is a steering post column 10. The parts referred to are conventional in an automobile construction and to which the present invention is adapted.

A block 11 is secured on the steering post 5 within the column 10 and engaging therewith is a sleeve-type bearing 12 having slidable contact with the column and includes an end wall 13 at one end and an inwardly directed flange or track 14 at the opposite end. Throttle rods 15 are slidable through the block 11 and are connected with the end wall 13 of the sleeve bearing and extend downwardly in the column and pass exteriorly thereof, as shown at 16, and are secured to a band or sleeve 17 slidably mounted on the exterior of the column. The throttle rods 15 extend outwardly of the column below the floor board indicated by the character 18. The lower ends of the throttle rods are connected to coil springs 19 which are in turn anchored to the column 10 as shown at 20, and act to urge the bearing sleeve in engagement with the block 11 and the latter acts as a stop for limiting the downward movement of the bearing sleeve as well as the throttle rods under the influence of the springs 19. An extension 21 is formed on the sleeve 17 and is apertured to permit the usual throttle rod of the carbureter of the engine of the automobile to be fastened thereto and when the sleeve is in its lowermost position under the influence of the springs 19 the throttle will be substantially closed.

The hub 6 of the steering wheel is provided with an opening 22 in which is slidably mounted a rod 23 and the latter enters the bearing sleeve by way of the flanged end thereof and is provided with an offset lower end on which is journaled a roller 24 that rides on the flange 14 of the bearing sleeve. The other end of the rod 23 is connected to a flexible element 25 and the latter is secured to and wound on a grooved pulley 26 secured to the inner end of a hand grip 27. The hand grip is in the shape of a spoke of the steering wheel and has its outer end journaled in the rim 8 of the steering wheel while its inner end is journaled in the hub. A cap 28 is carried by the steering wheel hub and encloses the pulley and flexible element 25.

Instead of employing the pulley 26, a crank arm 29 may be secured to the hand grip 27 and have the flexible element 25 connected thereto or if desired, a rod (not shown) may be substituted for the flexible element by having the rod pivotally connected to the crank arm and fastened to the rod 23.

In operation, the driver may rotate the hand grip 27 in one direction to pull upwardly on the throttle rods 15 and thereby bring about opening of the throttle of the engine of the automobile. A reverse rotation of the hand grip will bring about closing of the throttle of the engine. The springs 19 act to urge the throttle rods 15 downwardly or towards the position of closing the throttle of the engine and as the throttle rods move downwardly they move the bearing sleeve 12 therewith until the latter engages the block 11. As the bearing sleeve moves downwardly the rod 23 moves therewith bringing about the reverse rotation of the hand grip.

Thus it will be seen that when the throttle is open and held in that position by a person gripping the hand grip 27 the throttle may be allowed to close by simply releasing the hand grip.

A coil spring 30 surrounds the rod and seats against the hub at one end and its opposite end in a cup-shaped washer 31 pinned on the rod. This spring also tends to move the rod 23 downwardly and the hand grip in a reverse direction or in the direction of closing the throttle of the engine.

From the foregoing description it will be seen that a simple and efficient hand throttle has been provided for an automobile wherein the hand grip is located on the steering wheel and simulates one of the spokes of the steering wheel so that the driver when desiring to control the speed of the engine of the automobile by hand may do so by rotating the hand grip in one direction and to slow down the speed it is only necessary to permit the reverse rotation of the hand grip as gradual as desired under the influence of the springs 19 and 30.

It is believed that the foregoing description, when taken in connection with the drawings will fully set forth the construction and advantages of this invention to those skilled in the art to which such a device relates, so that further detailed description will not be required.

Having thus described my invention, what I claim is:

1. In combination with a steering wheel having a rim and a hub connected to said rim by spokes with one of said spokes rotating mounted in the rim and hub to form a hand grip of a throttle, and means for connecting the hand grip to a throttle of an automobile for the control of the latter.

2. In a device of the character described, a bearing sleeve slidably mounted in a steering column, means for connecting said sleeve to a throttle of an automobile, a rod extending into said bearing sleeve, a track on said bearing sleeve, a roller carried by said rod and engaging the track, and a hand grip rotatably mounted on the steering wheel and connected to said rod for imparting sliding movement to the bearing sleeve.

3. In combination with a steering mechanism including a steering wheel having a hub and a steering post connected to said hub and a column for said steering post, a bearing sleeve slidable in said column, throttle rods connected to said bearing sleeve and extending outwardly of the column, tension means connected to said throttle rods for urging them in one direction, a stop mounted in said column for limiting the movement of the throttle rods under the influence of said spring means, means for connecting the throttle rods to a throttle of an automobile, a hand grip rotatably mounted on the steering wheel, and means connecting the hand grip to the bearing sleeve for imparting sliding movement in an opposite direction by the rotation of said hand grip.

4. In combination with a steering mechanism including a steering wheel having a hub and a steering post connected to said hub and a column for said steering post, a bearing sleeve slidable in said column, throttle rods connected to said bearing sleeve and extending outwardly of the column, tension means connected to said throttle rods for urging them in one direction, a stop mounted in said column for limiting the movement of the throttle rods under the influence of said spring means, means for connecting the throttle rods to a throttle of an automobile, a hand grip rotatably mounted on the steering wheel, a rod slidable in the hub and entering the bearing sleeve, a track on said bearing sleeve, a roller carried by said rod and engaging the track, a hand grip journaled on the steering wheel, and means for connecting said hand grip to said rod.

5. In combination with a steering mechanism including a steering wheel having a hub and a steering post connected to said hub and a column for said steering post, a bearing sleeve slidable in said column, throttle rods connected to said bearing sleeve and extending outwardly of the column, tension means connected to said throttle rods for urging them in one direction, a stop mounted in said column for limiting the movement of the throttle rods under the influence of said spring means, means for connecting the throttle rods to a throttle of an automobile, a hand grip rotatably mounted on the steering wheel, a rod slidable in the hub and entering the bearing sleeve, a track on said bearing sleeve, a roller carried by said rod and engaging the track, a hand grip journaled on the steering wheel, a grooved pulley secured to the hand grip, and a flexible element secured to said rod and wound on and secured to said pulley.

6. In combination with a steering mechanism including a steering wheel having a hub and a steering post conected to said hub and a column for said steering post, a bearing sleeve slidable in said column, throttle rods connected to said bearing sleeve and extending outwardly of the column, tension means connected to said throttle rods for urging them in one direction, a stop mounted in said column for limiting the movement of the throttle rods under the influence of said spring means, means for connecting the throttle rods to a throttle of an automobile, a hand grip rotatably mounted on the steering wheel, a rod slidable in the hub and entering the bearing sleeve, a track on said bearing sleeve, a roller carried by said rod and engaging the track, a hand grip journaled on the steering wheel, a crank arm secured to the hand grip, means for connecting the crank arm to said rod.

7. In combination with a steering mechanism including a steering wheel having a hub and a steering post connected to said hub and a column for said steering post, a bearing sleeve slidable in said column, throttle rods connected to said bearing sleeve and extending outwardly of the column, tension means connected to said throttle rods for urging them in one direction, a stop mounted in said column for limiting the movement of the throttle rods under the influence of said spring means, means for connecting the throttle rods to a throttle of an automobile, a hand grip rotatably mounted on the steering wheel, a rod slidable in the hub and entering the bearing sleeve, a track on said bearing sleeve, a roller carried by said rod and engaging the track, a hand grip journaled on the steering wheel, a crank arm secured to the hand grip, means for connecting the crank arm to said rod, a spring mounted on said rod and having one end bearing against said hub, a cupped washer pinned on said rod and engaged by the other end of the spring to maintain the roller in riding contact with the track of the bearing sleeve.

EVERETT JOSEPH TATE.